Jan. 15, 1963   R. GOTTSCHALD   3,073,634
BALL AND SOCKET JOINTS
Filed Sept. 22, 1959

Inventor
Rudolf Gottschald,
By Diggins & LeBlanc
Attorneys

United States Patent Office 3,073,634
Patented Jan. 15, 1963

3,073,634
BALL AND SOCKET JOINTS
Rudolf Gottschald, Osterrath, near Dusseldorf, Germany, assignor to Viktor Langen, Dusseldorf-Oberkassel, Germany
Filed Sept. 22, 1959, Ser. No. 841,535
Claims priority, application Germany Sept. 24, 1958
2 Claims. (Cl. 287—90)

This invention relates to improvements in ball and socket joints of the kind comprising a ball casing, a ball bolt and at least two bearing cups enclosing the head of the bolt.

The object of the invention is the lubrication of the head to increase the period of time between inspections, whereby it is possible either to construct a joint with a metal ball cup requiring little attention or to improve still further an already proposed joint having a bearing cup of plastic material requiring little attention.

According to the invention a part of the covering of the ball bolt head is formed by a porous insert, for example, of foamed material, felt or the like filled with lubricant. As the bearing cups are usually spring loaded and on loading therefore can yield to a certain amount there is a pumping action, whereby a film of lubricant is provided between the surfaces sliding on one another.

A further object of the invention is the lubrication of the porous or felt ring to provide the lubricant for the surfaces.

The invention will be described with reference to the accompanying drawings showing two arrangements of the invention:

Figure 1:
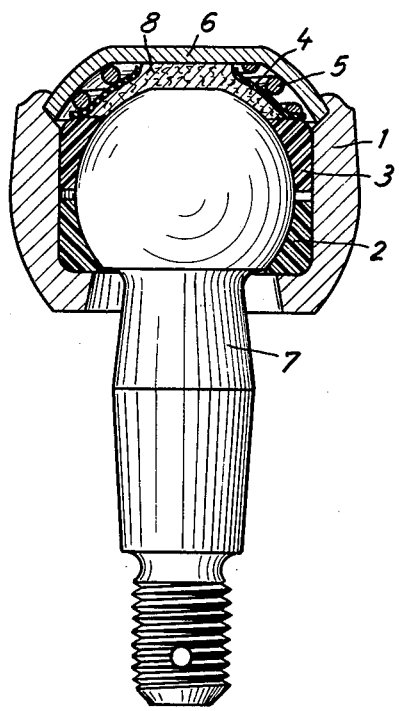
FIG. 1 is a vertical section of one form of the invention.

In FIG. 1 the ball joint consists of a ball casing 1, two bearing cups 2, 3, a resilient plate 4, a spring 5, a closing cap 6 and a ball bolt 7. The head of the ball bolt rotates in the bearing cups 2, 3. The space above the bearing cup 3 is filled with an insert 8 of porous foamed material, felt or the like. On being loaded the bearing cup 3 oscillates, that is, it moves up and down and in this way causes a film of lubricant to be forced between the bearing surfaces of the cup on the ball head.

Figure 2:
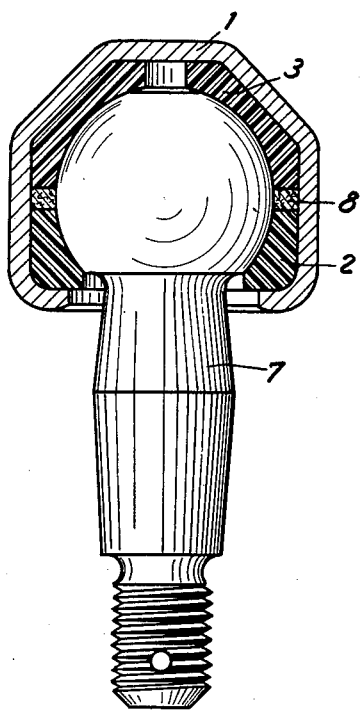
FIG. 2 is a vertical section of a further form.

The bearing cups 2, 3 may also according to FIG. 2 be formed of elastically resilient synthetic material between the impact surfaces of which the insert 8 of annular shape, is mounted, thereby further improving the favourable lubricating properties of the ball joint. With every loading the ball cups are slightly deformed whereby lubricant is continuously pressed out of the insert 8 to provide a film between the bearing surfaces.

A lubricating nipple for the insert material 8 may be provided.

The porous insert 8 holds the lubricant substantially longer than a hollow space without insert. In this way, with the use of metal ball cups a joint requiring little attention is obtained which requires a fresh filling of grease only at very long intervals of time. Joints with synthetic material bearing cups requiring no attention are on the other hand further improved in respect of a prolongation of their life.

I claim:
1. A ball and socket joint comprising: a ball casing; a ball bolt; a head on said bolt; at least two bearing cups surrounding said bolt head and mounted in said casing, and an insert of resilient porous material impregnated with lubricant and engaging said bolt head adjacent one of said cups; at least one of said cups resiliently bearing against said bolt head so that the movement of said resiliently bearing cup during operation of said joint compresses said insert to effect a pumping action supply of lubricant to the surface of said bolt head; a resilient plate in contact with said insert; a spring pressing said plate into intimate contact with said insert; and a cap engaging said casing and maintaining said spring in position.

2. A ball and socket joint as in claim 1 in which said insert is arranged on the side of the head remote from the bolt.

References Cited in the file of this patent
UNITED STATES PATENTS

| 2,083,718 | Kull et al. | June 15, 1937 |
| 2,906,568 | Gray | Sept. 29, 1959 |
| 2,912,267 | Latzen | Nov. 10, 1959 |
| 2,921,809 | Kogstrom | Jan. 19, 1960 |

FOREIGN PATENTS

| 227,036 | Great Britain | Jan. 8, 1925 |